Patented May 29, 1951

2,555,211

UNITED STATES PATENT OFFICE 2,555,211

METHOD OF MAKING LACTOSE

Alexander E. Wallace, Columbus, Ohio, assignor to M & R Dietetic Laboratories, Inc., a corporation of Ohio No Drawing. Application June 20, 1947,
Serial No. 756,107

10 Claims. (Cl. 127—31)

This invention relates to the recovery of lactose in a crystalline form of high purity from lactose-bearing liquids. In its more limited aspects it relates to the recovery of lactose from lactose-bearing liquids containing proteinaceous substances, inorganic cations and anions, and other inorganic and organic chemical substances and which contain little or no acidity, such as sweet wheys, for example.

Sweet wheys are the preferred starting materials to which the process of my invention may be applied. Fresh whole milk or skim milk and like lactose-bearing liquids also may be used as starting materials in accordance with the present invention. By sweet wheys I mean those wheys obtained from milk, or milk products, having a pH no lower than about 5.8 and usually in a range of about 6.1 to 6.6, or higher. Examples are those wheys obtained in the manufacture of cheddar type cheese, Swiss type cheese, and the like. Such wheys contain proteins, inorganic salts, certain vitamins, other known and unknown substances, and lactose.

In the commercial process of manufacturing lactose the problem is that of separating the lactose from the other substances present in lactose-bearing liquids and obtaining the lactose in a crystalline form containing only minor amounts of nitrogenous substances, inorganic salts, and other impurities. I have solved this problem by the process of the present invention, in a simple and economical manner.

In the conventional process as generally practiced in the art of making lactose from whey, the whey proteins are coagulated by heating their solution at a pH near their isoelectric point, or after adding lime to produce a pH in their solution of about 6.2 to 6.4. When sweet whey is the starting material and the proteins are to be coagulated at a pH near their isoelectric point, an acid is added to effect the proper pH. When the lime-heat method of protein coagulation is used on sweet whey the pH first must be lowered by the addition of acid, or acidic substances, before lime is added so that enough lime may be added to effect protein coagulation without raising the pH higher than about 6.4. In the lime-heat method a part of the inorganic salts, principally calcium phosphate, is precipitated approximately simultaneously with the coagulation of the proteins.

The coagulated and precipitated substances, produced by either of the foregoing methods, are then removed from the lactose solution usually by some suitable means of filtration. The filtered liquid is partially condensed. During this step in the process additional precipitation of proteinaceous substances and inorganic salts occurs making a second filtration step necessary. After the second filtration the liquid is condensed further to some definite concentration of solids which are not wholly in true solution. The condensed liquid is then subjected to controlled cooling so as to crystallize the lactose and the resulting massecuite is centrifuged in a perforated basket to separate the lactose crystals from the mother liquor. The crystals are then washed with water to remove a goodly portion of the water-soluble substances.

The lactose at this point is contaminated with considerable amounts of insoluble substances, principally calcium phosphate, and does not meet the requirements of a lactose of high purity. The crystals are therefore redissolved in water, the solution is treated with purifying carbon and other ingredients and filtered. The resulting filtered solution is re-condensed to a definite concentration of solids, and the lactose contained therein is recrystallized, centrifuged, washed, and dried. The method usually produces crystalline lactose of high purity meeting the U. S. P. standards. The yield usually is about 50 to 60 per cent of the amount of lactose originally present in the starting material.

The process of the present invention is novel and distinctly advantageous in that only one step for separating the coagulated and precipitated substances from the liquid, one condensing step, one crystallizing step, and one centrifuging and washing step are necessary to recover from lactose-bearing liquids crystallized lactose of high purity. The steps of re-solution of the once crystallized lactose and the treatment of the resulting solution with purifying carbon, etc. as in the conventional process described are unessential in the operation of my process. Moreover, by employing my process I have been able consistently to effect yields of crystallized lactose of high purity amounting to about 73% to 85%, or even greater, of the amount of lactose originally present in lactose-bearing liquids such as sweet whey. The savings in time and labor, the reduction in cost per pound of final product, and the materially increased yields of a valuable food substance are of very considerable economic importance. Also, it will be evident from the description of my process that the manner in which the pH of the lactose-bearing solution is adjusted so as to fall near the isoelectric point of the proteins present therein is novel and advantageous.

The process of my invention essentially consists in contacting lactose-bearing liquid containing inorganic cations and anions and having a pH no lower than about 5.8 with a suitable cationic exchanger material, preferably until the pH of the liquid is adjusted to approximately 4.0 to 4.7. The exchanger-treated liquid, at a pH of approximately 4.0 to 4.7, effected with or without the addition of an alkali or an acid to the treated liquid, is then heated to coagulate the proteins that are present. The coagulum is separated from the liquid, the clarified liquid is condensed to some definite concentration of solids and the lactose present in the concentrated liquid is crystallized. The resulting massecuite is centrifuged to separate the crystals of lactose from the mother liquor, the lactose crystals are washed with water to remove therefrom practically all of the soluble salts and other contaminating substances, and the resulting crystalline lactose is dried.

Lactose-bearing liquids, such as sweet whey derived from milk and milk products, contain calcium phosphate and calcium citrate and substantially smaller quantities of magnesium phosphate and magnesium citrate. These salts are soluble at the concentrations in which they occur in normal wheys but are precipitated as insoluble substances when their solutions are concentrated as is done in the condensing step of making lactose. If not removed previous to the crystallizing step these salts interfere with lactose crystallization, contaminate the crystallized lactose and are not easily washed therefrom with water without re-dissolving inordinate amounts of the lactose. In the step of the process of my invention comprising the contacting of a lactose-bearing liquid with cationic exchanger material the potentially insoluble salts present in the liquid are converted to highly soluble salts or acids which do not interfere with lactose crystallization and which may be readily washed from the crystallized lactose.

In contacting the lactose-bearing liquid with active cationic exchanger material in accordance with my invention there is removed from the liquid most of the calcium and magnesium by the interchange of these cations for monovalent cations which thereupon form new salts, or acids, with the phosphate and citrate ions remaining in the liquid. These newly formed phosphate and citrate salts are highly soluble in water, in contradistinction to the phosphates and citrates of calcium and magnesium, and remain in solution during the condensing step in the process of making lactose. Even though the new salts may contaminate the crystals of lactose when separated from the mother liquor they are easily washed therefrom with water without inordinate re-solution of the lactose.

As an example of the effect of contacting whey with cationic exchanger material acting in the sodium cycle, calcium and magnesium ions are removed from the liquid and sodium ions pass from the exchanger material into the whey. Thus calcium and magnesium phosphates and citrates, having low solubility in water, are converted into sodium phosphates and citrates, having high solubility in water.

Potassium salts are normal constituents of whey. When whey is passed through a bed of cationic exchanger material acting in the sodium cycle a considerable portion of the potassium ions are taken up by the exchanger material from the first fraction of that whey through the bed. As the flow of whey through the bed continues the exchanger material becomes saturated with respect to potassium ions but still has power to take up calcium and magnesium ions for which the exchanger material has greater affinity. The exchanger material now in effect becomes a potassium exchanger and will give up its potassium ions in exchange for calcium and magnesium ions. The net effect, therefore, is as though the exchanger material continued to act in the sodium cycle with respect to its absorption of calcium and magnesium ions.

I have found that when lactose-bearing liquids, such as whey, are contacted with cationic exchanger material acting in the hydrogen cycle all species of cations, mainly calcium, magnesium, potassium, and sodium, in the first part of the liquid through the bed of exchanger material are taken up and hydrogen ions pass into the liquid to convert the anions present into their respective acids. As the volume of liquid through the bed increases the exchanger material becomes saturated with respect to sodium and potassium but continues thereafter to take up calcium and magnesium ions giving up in exchange its sodium and potassium ions. While I am not prepared to explain the exact rearrangement of ions that takes place, the net effect appears to be that the anions originally combined with calcium and magnesium are converted to acids, or acid salts, thereby greatly reducing the pH of the whey. When cationic exchanger material is regenerated to act in the mixed sodium-hydrogen cycle and a lactose-bearing liquid, such as whey, is contacted therewith the net effect is the removal of calcium and magnesium ions from the liquid and conversion of the anions present in the whey to a mixture of acids and sodium salts of these acids.

In carrying out the cationic exchange step of my invention I prefer to have the cationic exchanger material acting in the mixed alkali metal-hydrogen cycle. The cationic exchanger material may be thus activated by regenerating with a suitable mixture of an alkali metal salt and an acid in aqueous solution. I prefer to use sodium chloride and hydrochloric acid for this purpose although other alkali metal salts, such as sodium sulfate, potassium chloride, sodium acetate, and potassium sulfate, and other acids, such as sulfuric acid, acetic acid, and the like may be used. I have found that, in passing sweet whey through cationic exchanger material acting in the mixed sodium-hydrogen cycle, the pH of the composite effluent from the exchanger may be made to vary over a wide range, say from about 2.0 to 6.0 by varying the proportion of salt and acid in the regenerating solution. The ratio of metal alkali salt to acid used in the regenerating solution depends on the ultimate pH I desire to have in the whey effluent from the exchanger. By increasing the amount of acid in proportion to the salt in the regenerating solution the ultimate pH of the treated product is thereby lowered; in a similar manner, by decreasing the amount of acid in proportion to the salt in the regenerating solution the ultimate pH of the treated product is thereby raised.

By using a mixed solution of sodium chloride and hydrochloric acid, in proper proportions for regenerating the cationic exchanger material, I am enabled subsequently to treat lactose-bearing solutions, such as whey, having a pH no lower than about 5.8 and generally in the range of from 6.1 to 6.6, by contact with the exchanger material so that the composite effluent therefrom will have a pH near the isoelectric point of the whey proteins. This is important to the steps in the process that follow which are coagulation of the whey proteins and subsequent separation of the coagulum from the lactose-bearing liquid.

Whey proteins may be coagulated by heating their solution at, or near, the boiling point when the pH of the solution is in a range of from about 4.0 to 4.7. It is an easy matter to regenerate the cationic exchanger material in the manner just described so that the pH of the subsequently treated whey falls within this range. Occasionally the pH may slightly deviate from this range in which case it may be adjusted to fall within the range by adding a small amount of alkali, preferably sodium hydroxide, or acid, preferably hydrochloric acid, as needed.

I have found that the addition of sodium hydroxide or similar alkali metal hydroxide or hydrochloric acid or similar acid at this point does not affect either the quality or yield of lactose which is eventually obtained by the process.

In a typical operation of my invention to obtain crystallized lactose, showing the effect of contacting whey with cationic exchanger material acting in the alkali metal-hydrogen cycle, whey obtained from the manufacture of cheddar cheese from whole milk was percolated downward through a bed of carbonaceous cationic exchanger material previously regenerated so as to act in the mixed sodium-hydrogen cycle. The volume of exchanger material was 40 liquid gallons and was contained in a vertical cylinder of 17.5 inches internal diameter and 233 square inches internal cross section. Previous to the treatment of the whey the exchanger material was regenerated with 240 gallons of a solution containing 600 milliequivalents of sodium chloride and 100 milliequivalents of hydrochloric acid per liter and thereafter was washed with water to remove the excess regenerating solution. The whey was passed through the bed of exchanger material at the constant flow rate of 7 gallons per minute; about 3,400 pounds of whey were treated to remove the calcium and magnesium ions to the extent desired before regeneration of the bed was necessary. In all, 17,080 pounds of whey were passed through the exchanger bed in a series of 5 cycles.

The pH of the original whey was 6.31 and that of the mixed whey after contact with the exchanger material was 4.35 which is sufficiently close to the isoelectric point of whey proteins to cause protein coagulation upon heating without further adjustment of the pH. The original whey contained 4.58% lactose, 0.485% ash, 0.044% calcium, and 0.048% phosphorus whereas the mixed whey after contact with the exchanger material contained 4.49% lactose, 0.453% ash, 0.003% calcium, and 0.046% phosphorus after correction for dilution from residual water in the bed of exchanger material. The slight loss in lactose content may be apparent rather than real because of analytical error.

The mixed whey, after contact with the cationic exchanger material, was heated to 200° F. by direct steam injection and held at that temperature for 15 minutes with constant stirring to coagulate the whey proteins. The coagulum was allowed to settle during a period of 30 minutes and the supernatant liquid, amounting to 15,170 pounds of diluted whey (dilution due primarily to condensation of steam used for heating the treated whey to 200° F.), was siphoned off and passed through a filter press to remove small quantities of coagulated protein still in suspension. The filtered whey was condensed in vacuo to a concentration of 47% total solids. The amount of lactose present in the concentrated whey was 493 pounds. The concentrated whey was slowly cooled while constantly stirring under controlled conditions so as to crystallize the lactose to proper crystal size. The resulting massecuite was centrifuged in a conventional type perforated basket centrifuge to separate the lactose crystals from the mother liquor. The crystals were then washed with cold water while held in the rotating centrifuge basket. The wash water, containing dissolved lactose, inorganic salts, and soluble nitrogenous substances, was recovered and subsequently condensed and crystallized, and the crystals centrifuged and washed to obtain additional lactose.

A total yield of 413 pounds of lactose (dry weight) was obtained. This amounted to about 83.8% of the amount of lactose present in the concentrated whey. I have found that there is a loss of about 10% of the lactose present in the original whey due to mechanical losses, slight hydrolysis of the lactose, etc. Allowing 10% for this loss the yield was 75.4% of the amount of lactose originally present in the filtered whey. Analysis showed that the dried lactose contained 0.023% ash and 0.103% nitrogen.

It will be understood that in a practical day-to-day operation of my invention that part of the lactose-bearing liquid containing the settled coagulum would not be discarded as was done in the example given but instead would be subjected to separation by some suitable means to remove the coagulum from the liquid so as to recover nearly all of the liquid containing valuable lactose. Had this been done the yield of lactose would have been substantially greater than the 413 pounds indicated.

Although I have found that the wash water containing dissolved lactose from the washing of the crystallized lactose may be subjected to condensing, crystallizing, centrifuging, and washing of the crystallized lactose to recover lactose of high purity, an alternate procedure may be used in which the wash water is added to the next batch of whey and thereby subjected to all the steps in the process beginning with the cationic exchanger treatment.

I have found in the operation of my invention that the mother liquor that is separated from the crystallized lactose may be contacted with cationic exchanger material, the treated liquid condensed to a definite concentration of solids, the lactose crystallized, the crystals separated from the liquid and the crystals washed with water to obtain about 40% of the lactose present in the mother liquor. This step in the process increases the overall yield of lactose by about 5 to 10%, depending primarily upon the amount of lactose in the mother liquor. In a practical operation this step may be carried out either by accumulating the mother liquor from several batches of whey and passing it through all of the steps of the process, or by adding the mother liquor to the next batch of whey to be processed.

While I prefer to use cationic exchanger material acting in the mixed alkali metal-hydrogen cycle because of the resulting favorable pH in the treated liquid, I have found that cationic exchanger materials acting solely in the hydrogen cycle may be used for the purposes of my invention. The treatment of lactose-bearing liquids, such as whey, with cationic exchanger materials acting in the hydrogen cycle removes from such liquids calcium and magnesium ions to the extent desired and produces in the liquid a pH considerably below the range favorable for protein coagulation by heating. In such cases I have found that enough alkali, preferably an alkali metal hydroxide such as sodium hydroxide, can be added to bring the pH of the liquid into the favorable range for protein coagulation without unfavorably influencing the purity or yield of crystallized lactose recovered from the liquid. I prefer to use hydrochloric acid for regenerating the exchanger material to the hydrogen cycle but other acids, such as sulfuric acid, acetic acid, and the like, may be used for this purpose.

In a typical operation 10 gallons of sweet whey per gallon of exchanger material were percolated through a bed of carbonaceous cationic exchanger material acting in the hydrogen cycle. The pH of the original whey was 6.33 and after contact with the exchanger material the composite liquid had a pH of 2.52. The original whey contained about 0.042% calcium whereas the whey after contact with the exchanger material contained about 0.004% calcium. The pH of the liquid was adjusted to 4.43 by the addition of a solution of sodium hydroxide before the liquid was heated to coagulate the whey proteins. The procedure following the pH adjustment was the same as in the foregoing example, resulting in a yield and quality of lactose comparable to that of the example.

Although the use of cationic exchanger materials acting either in the mixed alkali metal-hydrogen cycle or solely in the hydrogen cycle has certain advantages, I have found that cationic exchanger material acting solely in the alkali metal cycle may be used for the purpose of my invention. The treatment of lactose-bearing liquids, such as whey, with cationic exchanger materials acting in the alkali metal cycle removes from such liquids calcium and magnesium ions to the extent desired and produces in the liquid a pH value considerably above the range desirable for protein coagulation by heating. In such cases I have found that a requisite amount of a suitable acid, such as hydrochloric acid, can be added to reduce the pH of the liquid into a range favorable for protein coagulation without adversely influencing either the yield or purity of the crystallized lactose ultimately recovered from the liquid.

In a typical operation 175 gallons of sweet cheese whey having a pH of 6.14 were percolated through a bed of resinous cationic exchanger material acting solely in the sodium cycle. The volume of exchanger material was 17.5 liquid gallons and was contained in a vertical cylinder of 15 inches internal diameter. Previous to the treatment of the whey the exchanger material was regenerated with 90 gallons of a solution containing about 1,000 milliequivalents of sodium chloride and 22 milliequivalents of sodium hydroxide per liter. The flow rate of the whey through the exchanger material was held constant at 0.167 gallon per liquid gallon of exchanger material per minute. The pH of the mixed effluent whey was 6.62. The pH of 100 gallons of the effluent whey was lowered to 4.47 by the addition of hydrochloric acid and the acidulated whey was heated at about 205° F. for 10 minutes in order to coagulate the whey proteins. After holding the liquid for 45 minutes it was filtered in order to separate the coagulum therefrom and to obtain a clear liquid. The pH of the whey was adjusted to 6.38 by the addition of a solution of sodium hydroxide and was condensed to a concentration of about 54% solids. The condensed whey was subjected to controlled cooling in order to crystallize the lactose. The massecuite was centrifuged in a perforated basket and the lactose crystals were washed with water. An additional crop of crystals was recovered from the wash water. The overall yield was about 75% of the amount of lactose originally present in the whey. The dried lactose contained 0.212% ash and 0.019% nitrogen.

When the cationic exchanger material is regenerated to the mixed alkali metal-hydrogen cycle, a solution containing between about 300 and 1,500, preferably about 600, milliequivalents of alkali metal salt and between about 10 and 250, preferably about 100, milliequivalents of acid per liter is used. Satisfactory regeneration is achieved by using between about 3 and 15 gallons of regenerating solution per liquid gallon of exchanger material. In a pertinent example where a solution containing about 600 milliequivalents of sodium chloride and about 150 milliequivalents of hydrochloric acid per liter was used for the purpose of regenerating a bed of carbonaceous cationic exchanger material, and where such solution was percolated at room temperature through the bed at a flow rate in the vicinity of 5 gallons per liquid gallon of exchanger material per hour, about 6 gallons of the regenerating solution per liquid gallon of exchanger material were required for satisfactory regeneration.

When the cationic exchanger material is regenerated to the hydrogen cycle, a solution containing between about 100 and 600, preferably about 400, milliequivalents of acid per liter is used. Satisfactory regeneration is achieved by using between about 3 and 15 gallons of regenerating solution per liquid gallon of exchanger material. In a pertinent example where a solution containing about 400 milliequivalents of hydrochloric acid per liter was used for the purpose of regenerating a bed of carbonaceous cationic exchanger material, and where such solution was percolated through the bed at a flow rate in the vicinity of 5 gallons of the regenerating solution per liquid gallon of exchanger material per hour, about 6 gallons of regenerating solution per liquid gallon of exchanger material were required for satisfactory regeneration.

When the cationic exchanger material is regenerated to the alkali metal cycle, a solution containing between about 300 and 1,500, preferably about 1,000, milliequivalents of alkali metal salt per liter is used. Satisfactory regeneration is achieved by using between about 3 and 15 gallons of regenerating solution per liquid gallon of exchanger material. In a pertinent example where a solution containing about 1,000 milliequivalents of sodium chloride per liter was used for the purpose of regenerating a bed of carbonaceous cationic exchanger material, and where such solution was percolated through the bed at room temperature at a flow rate in the vicinity of 5 gallons of the regenerating solution per liquid gallon of exchanger material per hour, about 6 gallons of regenerating solution per liquid gallon of exchanger material were required for satisfactory regeneration.

In the cationic exchange step of my process I prefer to use a flow rate of the lactose-bearing liquid of about 0.175 gallon per liquid gallon of exchanger material per minute. I have found that when the flow rate is increased the exchanger material becomes less efficient in removing cations; consequently, too large an amount of the polyvalent cations remains in the treated liquid and the purity of the ultimate lactose crystals is adversely affected. On the other hand, when the flow rate is decreased the efficiency of cation removal is not increased sufficiently to justify the longer time required for treating the lactose-bearing liquid. I have found, further, that changing the flow rate from the preferred rate affects the ultimate pH of the exchanger treated lactose-bearing liquid when the exchanger material is acting in the mixed sodium-hydrogen cycle. Increasing the flow rate increases the pH and decreasing the flow rate decreases the pH. This is a factor to be considered when it is desired to have the pH of the exchanger treated liquid fall near the isoelectric point of the whey proteins. It should be understood, however, that flow rates other than the preferred rate can be used in carrying out the process of my invention.

I have found that there is a variable relationship between the volume of cationic exchanger material and the volume of lactose-bearing liquid that can be passed through the bed before the exchanger material becomes too spent to efficiently remove cations, such as calcium and magnesium ions, for the purpose of my invention. In general, 8 to 12 gallons of sweet whey, containing from about 0.035% to 0.050% of calcium, per liquid gallon of exchanger material can be treated to sufficiently remove the calcium and magnesium ions therefrom for the purpose of making lactose of high purity according to the process of my invention. Factors which affect the relationship between the volume of exchanger material and the volume of whey that can be treated are the type of exchanger material, the degree of activity of the exchanger material, and the concentration of ions, especially calcium and magnesium ions, present in the whey. A bed of exchanger material that is not completely regenerated will treat less whey than one that has been regenerated to its maximum activity. The volume of whey that can be treated by a given volume of exchanger material decreases with increases in concentration of calcium and magnesium in the lactose-bearing liquid. In this connection it is well known that wheys obtained from the manufacture of cheese vary considerably with respect to the amounts of calcium contained therein. It is to be understood that when crystalline lactose of lesser purity is desired the volume of lactose-bearing liquid treated in the cationic exchange step of my process may be substantially increased and, at the point at which treatment is stopped, the instantaneous concentration of calcium in the effluent may be substantially greater than 5 milliequivalents per liter.

When whey is passed through cationic exchanger material acting in the hydrogen cycle, in the mixed alkali metal-hydrogen cycle, or solely in the alkali metal cycle only traces of calcium appear in the first fraction of the effluent but subsequently the calcium concentration rises slowly as the volume of whey passed through the exchanger material increases. When the instantaneous concentration of calcium in the effluent reaches between 2 and 5, preferably 3, milliequivalents per liter the flow of whey is stopped and the exchanger material is regenerated for treating the next batch of whey. If a greater volume of whey is passed through the exchanger material the concentration of calcium in the effluent becomes too great and the purity of the resulting crystallized lactose is adversely affected. When sweet whey is treated with cationic exchanger material acting in the mixed sodium-hydrogen cycle in order to produce a pH in the effluent near the isoelectric point of the whey proteins the treatment is stopped at about the same point. Treating more whey will raise the pH beyond the desirable range as well as increase the concentration of calcium in the effluent.

After separating the coagulated substances from the lactose-bearing liquid and before proceeding to the condensing step in my process I have found it advantageous to adjust the pH of the liquid upward to within a range of about 5.8 to 6.6, preferably from about 6.2 to 6.4, using an alkali metal hydroxide, such as sodium hydroxide or potassium hydroxide, for this purpose. When heating of the liquid, having a pH lower than about 5.7, takes place during the condensing step a brownish colored insoluble substance of unknown composition is formed, especially if the heating is excessive with respect to time and/or temperature. This insoluble substance is most difficult to remove from the subsequently crystallized lactose and consequently adversely affects the purity and color of the lactose. I have found that when the pH of the liquid is adjusted to within the specified range the amount of the brownish colored substance formed at the time of condensing is inconsequential, or even nil.

The condensing step in my process is not limited to concentrating the whey to a total solids content in the vicinity of 47 to 54%. In the examples given the concentration was not carried out to the degree anticipated in commercial practice due to limitations imposed by the experimental conditions. I regard 47% total solids as being near the lower limit of concentration to be attained in the condensing step of my process and prefer to condense the whey to a total solids concentration in the vicinity of 70%, or to that concentration at which proper "graining" is observed, in order to minimize lactose losses in the mother liquor. The small quantity of salts of low solubility in water remaining in the lactose-bearing liquid after proper treatment with cationic exchanger material permits concentration to a higher degree than otherwise would be possible.

In the operation of my invention I have found that the separation of the protein coagulum from the lactose-bearing liquid may be accomplished by filtration, sedimentation, decantation, siphonation, centrifugation in an imperforate bowl, or by various combinations of any of the foregoing methods.

While this invention relates essentially to lactose-bearing liquids having a pH no lower than about 5.8 it is understood that the process may be applied to lactose-bearing liquids possessing a pH lower than 5.8 provided that first the pH of the liquid is raised to 5.8, or higher, by the addition of alkali. I prefer to use sodium hydroxide for adjusting the pH to 5.8, or higher, but other alkali substances, preferably alkali metal hydroxides, may be used for the purpose.

The use of specific types of cationic exchanger material in the examples presented herein does not indicate a particular preference for these types. Cationic exchanger materials of the carbonaceous and resinous type, and other cationic exchanger materials producing similar results, may be used in the operation of my invention.

I claim:

1. In the method of recovering lactose in a crystalline form of high purity from whey having a pH no lower than about 5.8, comprising contacting the said whey with a cationic exchanger material acting in the mixed alkali metal-hydrogen cycle, to effect replacement of calcium and magnesium ions in said whey with cations in said exchanger material, thereby changing those salts in the whey characterized by low solubility in water to salts and/or acids having high solubility in water, and to effect an adjustment of the pH of the whey so that it falls within the approximate range of 4.0 to 4.7, heating the resulting treated whey to coagulate proteins therein and separating the coagulated proteins from the whey liquid.

2. In the method of recovering lactose in a crystalline form of high purity from whey having a pH no lower than about 5.8, comprising contacting the said whey with a cationic exchanger material acting in the mixed alkali metal-hydrogen cycle, to effect replacement of calcium and magnesium ions in said whey with cations in said exchanger material, thereby changing those salts in the whey characterized by low solubility in water to salts and/or acids having high solubility in water, and to effect an adjustment of the pH of the whey so that it falls within the approximate range of 4.0 to 4.7, heating the resulting treated whey to coagulate proteins therein, separating the coagulated proteins from the whey liquid, adding an alkali metal hydroxide to the whey liquid to adjust the pH thereof upward to fall within the approximate range of 5.8 to 6.6, and condensing the resulting liquid until graining suitable for lactose crystallization is obtained.

3. In the method of recovering lactose in a crystalline form of high purity from whey having a pH no lower than about 5.8, comprising contacting the said whey with a cationic exchanger material acting in the mixed alkali metal-hydrogen cycle, to effect replacement of calcium and magnesium ions in said whey with cations in said exchanger material, thereby changing those salts in the whey characterized by low solubility in water to salts and/or acids having high solubility in water, and to effect an adjustment of the pH of the whey so that it falls within the approximate range of 4.0 to 4.7, heating the resulting treated whey to coagulate proteins therein, separating the coagulated proteins from the whey liquid, adding an alkali metal hydroxide to the whey liquid to adjust the pH thereof upward to fall within the approximate range of 5.8 to 6.6, condensing the resulting liquid until graining suitable for lactose crystallization is obtained, crystallizing the lactose in the said liquid, separating the lactose crystals from the resulting massecuite, washing the crystals and retreating the spent wash water along with fresh whey as claimed herein.

4. In the method of recovering lactose in a crystalline form of high purity from whey having a pH no lower than about 5.8, comprising contacting the said whey with a cationic exchanger material acting in the mixed alkali metal-hydrogen cycle, to effect replacement of calcium and magnesium ions in said whey with cations in said exchanger material, thereby changing those salts in the whey characterized by low solubility in water to salts and/or acids having high solubility in water, and to effect an adjustment of the pH of the whey so that it falls within the approximate range of 4.0 to 4.7, heating the resulting treated whey to coagulate proteins therein, separating the coagulated proteins from the whey liquid, adding an alkali metal hydroxide to the whey liquid to adjust the pH thereof upward to fall within the approximate range of 5.8 to 6.6, condensing the resulting liquid until graining suitable for lactose crystallization is obtained, crystallizing the lactose in the said liquid, separating the lactose crystals from the mother liquor in the resulting massecuite, washing the crystals and retreating the mother liquor along with fresh whey as claimed herein.

5. In the method of recovering lactose in a crystalline form of high purity from a lactose-bearing liquid having a pH no lower than about 5.8, comprising contacting the said liquid with a cationic exchanger material having replaceable monovalent cations therein of the class consisting of alkali metals, hydrogen and mixtures thereof, to effect replacement of calcium and magnesium ions in said liquid with the monovalent cations in the exchanger material, thereby changing those salts in the lactose-bearing liquid characterized by low solubility in water to salts and/or acids having high solubility in water, adjusting the pH of the treated liquid with a neutralizing agent so that it falls within the approximate range of 4.0 to 4.7, heating the resulting liquid to coagulate proteins therein, separating the coagulated proteins from the liquid, adding an alkali metal hydroxide to the liquid to adjust the pH thereof upward to fall within the approximate range of 5.8 to 6.6, thereby converting the acids present in said liquid to alkali metal salts having high solubility in water, condensing the resulting liquid until graining suitable for lactose crystallization is obtained, and crystallizing the lactose in the presence of the water-soluble salts.

6. In the method of recovering lactose in a crystalline form of high purity from a lactose-bearing liquid having a pH no lower than about 5.8, comprising contacting the said liquid with a cationic exchanger material having replaceable monovalent cations therein of the class consisting of alkali metals, hydrogen and mixtures thereof, to effect replacement of calcium and magnesium ions in said liquid with the monovalent cations in the exchanger material, thereby changing those salts in the lactose-bearing liquid characterized by low solubility in water to salts and/or acids having high solubility in water, adjusting the pH of the treated liquid with a neutralizing agent so that it falls within the approximate range of 4.0 to 4.7, heating the resulting liquid to coagulate proteins therein, separating the coagulated proteins from the liquid, adding an alkali metal hydroxide to the liquid to adjust the pH thereof upward to fall within the approximate range of 5.8 to 6.6, thereby converting the acids present in said liquid to alkali metal salts having high solubility in water, condensing the resulting liquid until graining suitable for lactose crystallization is obtained, crystallizing the lactose in the presence of the water-soluble salts, separating the lactose crystals from the mother liquor, and washing the lactose crystals with water to remove substantially all of the soluble salts adhering to said lactose crystals.

7. In the method of recovering lactose in a crystalline form of high purity from a lactose-bearing liquid having a pH no lower than about 5.8, comprising contacting the said liquid with a cationic exchanger material having replaceable monovalent cations therein, to effect replacement of calcium and magnesium ions in said liquid with the monovalent cations in the said exchanger material, thereby changing those salts in the lactose-bearing liquid characterized by low solubility in water to salts and/or acids having high solubility in water, adjusting the pH of the treated liquid with a neutralizing agent so that it falls within the approximate range of 4.0 to 4.7, heating the resulting liquid to coagulate proteins therein, separating the coagulated proteins from the liquid, adding an alkali metal hydroxide to the liquid to adjust the pH thereof upward to fall within the approximate range of 5.8 to 6.6, thereby converting the acids present in said liquid to alkali metal salts having high solubility in water, condensing the resulting liquid until graining suitable for lactose crystallization is obtained, crystallizing the lactose in the presence of the water-soluble salts, separating the lactose crystals from the mother liquor, and washing the lactose crystals with water to remove substantially all of the soluble salts adhering to said lactose crystals.

8. In the method of recovering lactose in a crystalline form of high purity from whey having a pH no lower than about 5.8, comprising contacting the said whey with a cationic exchanger material acting in the mixed alkali metal-hydrogen cycle, to effect replacement of calcium and magnesium ions in said whey with cations in said exchanger material, thereby changing those salts in the whey characterized by low solubility in water to salts and/or acids having high solubility in water and to effect an adjustment of the pH of the whey so that it falls within the approximate range of 4.0 to 4.7, heating the resulting treated whey to coagulate proteins therein, separating the coagulated proteins from the whey liquid, adding an alkali metal hydroxide to the whey liquid to adjust the pH thereof upward to fall within the approximate range of 5.8 to 6.6, thereby converting the acids present in said liquid to alkali metal salts having high solubility in water, condensing the resulting liquid until graining suitable for lactose crystallization is obtained, crystallizing the lactose in the presence of the water-soluble salts, separating the lactose crystals from the mother liquor, and washing the lactose crystals with water to remove substantially all of the soluble salts adhering to said lactose crystals.

9. In the method of recovering lactose in a crystalline form of high purity from whey having a pH no lower than about 5.8, comprising contacting the said whey with a cationic exchanger material acting in the hydrogen cycle, to effect replacement of calcium and magnesium ions in said whey with hydrogen ions in said exchanger material, thereby changing those salts in the whey characterized by low solubility in water to acids having high solubility in water, and to effect an adjustment of the pH of the whey to below the approximate range of 4.0 to 4.7, neutralizing the acidified, exchanger-treated whey so that the pH of the said whey falls within the approximate range of 4.0 to 4.7, heating the resulting treated whey to coagulate proteins therein, separating the coagulated proteins from the whey liquid, adding an alkali metal hydroxide to the whey liquid to adjust the pH thereof upward to fall within the approximate range of 5.8 to 6.6, thereby converting the acids present in said liquid to alkali metal salts having high solubility in water, condensing the resulting liquid until graining suitable for lactose crystallization is obtained, crystallizing the lactose in the presence of the water-soluble salts, separating the lactose crystals from the mother liquor, and washing the lactose crystals with water to remove substantially all of the soluble salts adhering to said lactose crystals.

10. In the method of recovering lactose in a crystalline form of high purity from whey having a pH no lower than about 5.8, comprising contacting the said whey with a cationic exchanger material acting in the alkali metal cycle, to effect replacement of calcium and magnesium ions in said whey with cations in said exchanger material, thereby changing those salts in the whey characterized by low solubility in water to salts having high solubility in water, and to effect an adjustment of the pH of the whey to above the pH of the starting material, acidifying the resulting exchanger-treated whey so that the pH thereof falls within the approximate range of 4.0 to 4.7, heating the resulting treated whey to coagulate proteins therein, separating the coagulated proteins from the whey liquid, adding an alkali metal hydroxide to the whey liquid to adjust the pH thereof upward to fall within the approximate range of 5.8 to 6.6, thereby converting the acids present in said liquid to alkali metal salts having high solubility in water, condensing the resulting liquid until graining suitable for lactose crystallization is obtained, crystallizing the lactose in the presence of the water-soluble salts, separating the lactose crystals from the mother liquor, and washing the lactose crystals with water to remove substantially all of the soluble salts adhering to said lactose crystals.

ALEXANDER E. WALLACE.

REFERENCES CITED

The following references are of record in the file of this patent:

UNITED STATES PATENTS

| Number | Name | Date |
| --- | --- | --- |
| 758,065 | Hall | Apr. 26, 1904 |
| 1,600,573 | Bell | Sept. 21, 1926 |
| 2,145,109 | De Lisle | Jan. 24, 1939 |
| 2,155,318 | Liebknecht | Apr. 18, 1939 |
| 2,319,649 | Walsh | May 18, 1943 |
| 2,365,221 | Shafor | Dec. 19, 1944 |
| 2,477,558 | Almy et al. | Aug. 2, 1949 |

FOREIGN PATENTS

| Number | Country | Date |
| --- | --- | --- |
| 542,846 | Great Britain | Jan. 29, 1942 |
| 116,691 | Australia | Mar. 9, 1943 |
| 13,444 | Great Britain | of 1890 |

OTHER REFERENCES

Myers et al., Ind. & Eng. Chem., vol. 33, No. 6, June 1941, pp. 697–706 (pp. 705 & 706 pertinent).

Chem. Soc. Jour. New Series, vol. 48, 1885, p. 848.